US 6,709,154 B1

(12) United States Patent
Janotte

(10) Patent No.: US 6,709,154 B1
(45) Date of Patent: Mar. 23, 2004

(54) RADIATION THERMOMETER AND RADIATION SENSOR WITH SEVERAL SENSOR ELEMENTS, METHOD FOR DETERMINING TEMPERATURE

(75) Inventor: Michael Janotte, Kronberg (DE)

(73) Assignee: Braun GmbH, Kronberg im Taunus (DE)

( * ) Notice: Subject to any disclaimer, the term of this patent is extended or adjusted under 35 U.S.C. 154(b) by 0 days.

(21) Appl. No.: 09/786,661

(22) PCT Filed: Aug. 26, 1999

(86) PCT No.: PCT/EP99/06266

§ 371 (c)(1),
(2), (4) Date: Mar. 7, 2001

(87) PCT Pub. No.: WO00/16050

PCT Pub. Date: Mar. 23, 2000

(30) Foreign Application Priority Data

Sep. 16, 1998 (DE) .......................... 198 42 403

(51) Int. Cl.$^7$ .................................. G01J 5/00

(52) U.S. Cl. ...................... 374/121; 374/130; 374/131

(58) Field of Search ................ 250/339.02, 339.04, 250/353, 349, 394, 332; 600/474, 549; 374/121, 130, 131

(56) References Cited

U.S. PATENT DOCUMENTS

| 4,431,918 | A | * | 2/1984 | White .................... 250/349 |
| 4,795,907 | A | * | 1/1989 | Maekawa et al. ........... 250/332 |
| 4,927,771 | A | * | 5/1990 | Ferrett ................... 250/332 |
| 4,994,664 | A | * | 2/1991 | Veldkamp ................. 250/332 |
| 5,006,711 | A | * | 4/1991 | Hamashima et al. ......... 250/349 |
| 5,030,828 | A | * | 7/1991 | Solomon ................... 250/332 |

(List continued on next page.)

FOREIGN PATENT DOCUMENTS

| DE | 300201 | 10/1983 | | |
| DE | 3633199 | 7/1988 | | |
| DE | 4309762 | 11/1995 | | |
| EP | 0566156 | 10/1993 | | |
| GB | 2319336 | 5/1998 | | |
| JP | 57142526 | 9/1982 | | |
| JP | 60102530 | A * | 6/1985 | ................. 374/121 |
| JP | 62119422 | 5/1987 | | |
| JP | 635226 | 1/1988 | | |
| JP | 63144222 | 6/1988 | | |
| JP | 63144222 | A * | 6/1988 | ................. 374/121 |
| JP | 147923 | 2/1989 | | |
| JP | 1047923 | 2/1989 | | |
| JP | 3263001 | 11/1991 | | |
| JP | 4333292 | 11/1992 | | |
| JP | 9084768 | 3/1997 | | |
| WO | 9514913 | 6/1995 | | |

Primary Examiner—Diego Gutierrez
Assistant Examiner—Mirellys Jagan
(74) Attorney, Agent, or Firm—Morgan, Lewis & Bockius LLP

(57) ABSTRACT

The invention is directed to a radiation thermometer with multiple sensor elements for detecting infrared radiation from differing regions, a radiation sensor with multiple infrared sensor elements, and a method for determining a temperature using a radiation thermometer equipped with such a radiation sensor. The radiation sensor (10) includes multiple optical elements (45, 50, 55) which are associated with a single or multiple sensor elements (30) and define the solid angle from which radiation can impinge on the respective sensor elements. A method for taking a patient's temperature using an ear thermometer equipped with a radiation sensor of the present invention is based on the tympanic membrane having a higher temperature than the ear canal. Hence part of the sensor elements that view the tympanic membrane will detect a higher temperature than the remaining sensors that view the ear canal. Accordingly, only temperature signals from the tympanic membrane are used for evaluation.

14 Claims, 2 Drawing Sheets

U.S. PATENT DOCUMENTS

| | | | | |
|---|---|---|---|---|
| 5,122,666 A | * | 6/1992 | Turnbull | 250/349 |
| 5,157,258 A | * | 10/1992 | Gunning, III et al. | 250/332 |
| 5,340,215 A | * | 8/1994 | Makita et al. | 374/121 |
| 5,368,038 A | * | 11/1994 | Fraden | 374/131 |
| 5,522,662 A | | 6/1996 | Shiokawa | |
| 5,631,467 A | | 5/1997 | Belcher et al. | |
| 5,701,008 A | | 12/1997 | Ray et al. | |
| 5,877,500 A | * | 3/1999 | Braig et al. | 250/332 |
| 6,192,268 B1 | * | 2/2001 | Yamamoto et al. | 600/474 |
| 6,203,194 B1 | * | 3/2001 | Beerwerth et al. | 374/133 |
| 6,222,111 B1 | * | 4/2001 | Kern | 250/339.02 |
| 6,606,115 B1 | * | 8/2003 | Alicandro et al. | 348/164 |
| 6,607,301 B1 | * | 8/2003 | Glukhovsky et al. | 374/175 |
| 6,631,287 B2 | * | 10/2003 | Newman et al. | 600/474 |
| 2001/0053171 A1 | * | 12/2001 | Sato et al. | 374/121 |
| 2002/0193703 A1 | * | 12/2002 | Sato et al. | 600/549 |

* cited by examiner

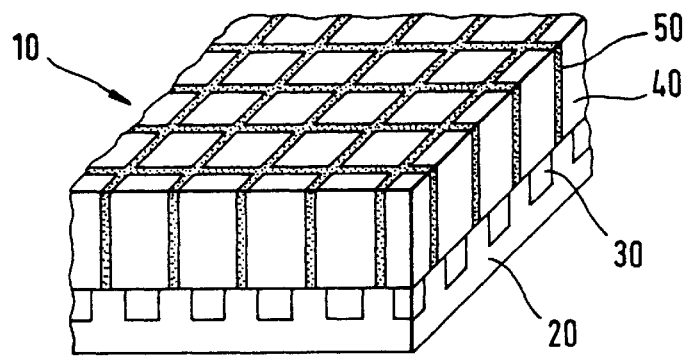
Fig. 1
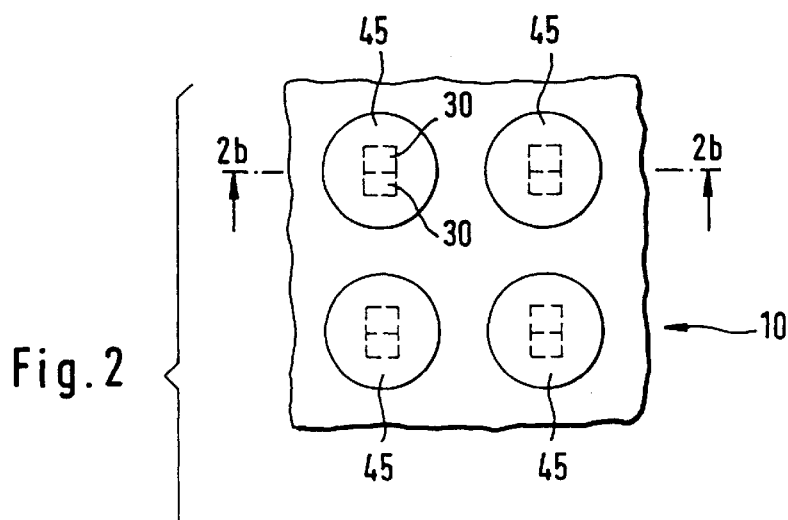
Fig. 2a
Fig. 2
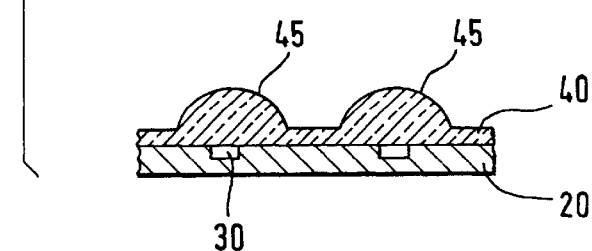
Fig. 2b
Fig. 5
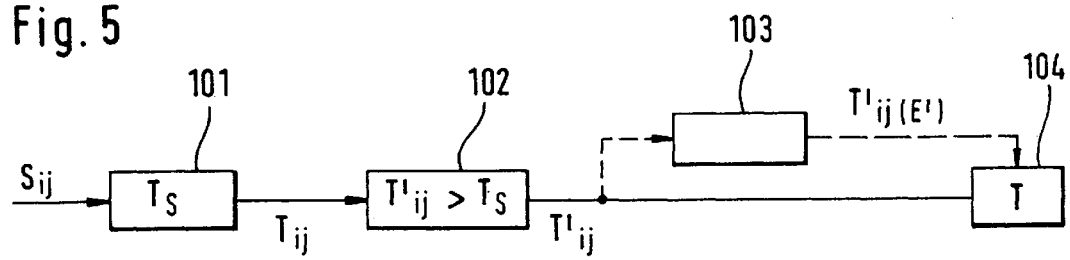

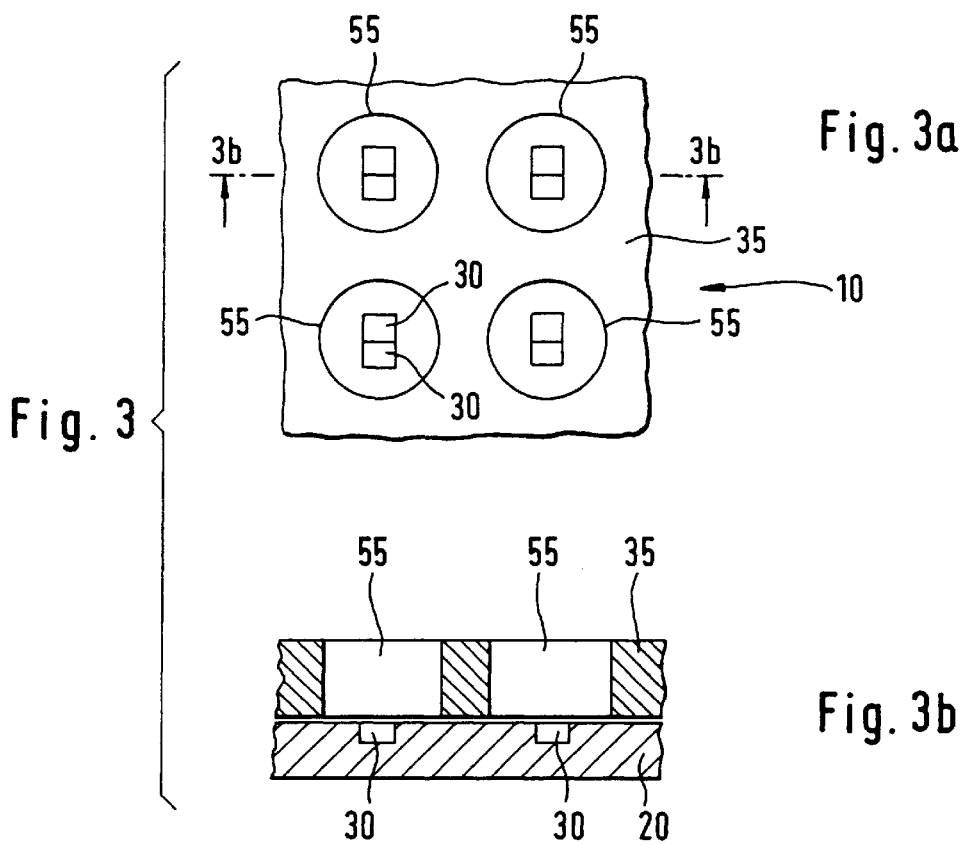
Fig. 3a
Fig. 3b
Fig. 3
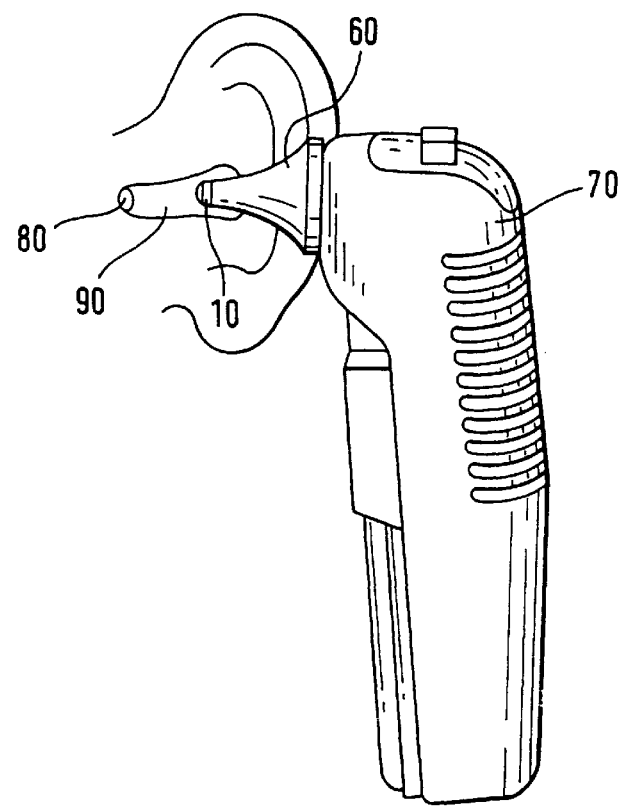
Fig. 4

US 6,709,154 B1

RADIATION THERMOMETER AND RADIATION SENSOR WITH SEVERAL SENSOR ELEMENTS, METHOD FOR DETERMINING TEMPERATURE

BACKGROUND

This invention relates to a radiation thermometer and a radiation sensor with multiple sensor elements for detecting infrared radiation from differing regions, and to a method for determining a temperature by means of such a radiation thermometer or radiation sensor.

The art knows of radiation thermometers having just a single infrared sensor element disposed at the end of an optical waveguide. The waveguide ensures that only radiation from a predetermined solid angle range impinges on the sensor element. Thus, for example, the probe head of an infrared thermometer designed to take a patient's temperature in the ear is dimensioned such that the sensor element exhibits a field of view only of the approximate size of the tympanic membrane. However, the field of view of the sensor element usually covers parts of both the tympanic membrane and the ear canal whose temperatures differ. Generally, therefore, not the tympanic temperature is taken, which is considered as being representative of the true body core temperature, but rather an intermediate value that lies between the tympanic and the ear canal temperature. Hence the accuracy of a temperature reading depends on the placement of the probe head in the ear canal, that is, on its distance to the tympanic membrane and on the angle it forms with the ear canal.

From WO 95/14913 an ear thermometer is known in which multiple sensor elements are arranged at the end of an optical waveguide so as to receive radiation from differing solid angle ranges. By corresponding evaluation of the signals supplied by the sensor elements, a temperature reading is obtainable which, while being relatively independent of the placement of the probe head in the ear, is likewise representative of an intermediate value which does not correspond to the true tympanic temperature.

The conventional infrared ear thermometers further have the disadvantage that the optical waveguide customarily employed, which is a small tube of a diameter of about 3 mm having its inner diameter gold plated, is very expensive, in addition to guiding heat from the ear into the interior of the probe head during a temperature measurement. Hence complex approaches are necessary to prevent corruption of the measurement result.

From EP 0 566 156 B1 an infrared sensor having two infrared sensitive elements is known, one being shielded against infrared radiation, the sensor being intended for use in a thermometer for measuring body temperature, and a method for manufacturing the sensor. By comparing the signals supplied by the two elements, a measurement signal is obtainable which is representative of the amount of incident infrared radiation and is largely free from electric noise and thermal disturbances. The infrared sensitive elements have their upper and undersides protected by coatings.

From JP-A-03-263001 an infrared sensor with a microlens is known, which is intended for use in an ear thermometer for taking a patient's temperature, and a method for manufacturing the sensor. The microlens serves to focus the infrared radiation on the infrared sensor. It has a diameter of 1.44 mm, approximately.

The manufacture of the known infrared sensors is accomplished using the processes known from the manufacture of semi-conductors, involving the formation of a plurality of sensor elements on a substrate subsequently cut into individual sensors each having one element only which are then provided with an enclosure, etc.

From JP-A-03-248477 an infrared sensor having four identical infrared sensitive elements is known, which is intended for use in an ear thermometer for taking a patient's temperature, and a method for manufacturing the sensor. The four elements are arranged on bridges extending across a recess in a substrate.

From JP-A-04-333292 a two-dimensional array of thermo-elements is known which is intended for an infrared image sensor.

From "Uncooled IR Focal Plane Arrays" by Paul W. Kruse, SPIE, vol. 2552, pages 556–563, sensor arrays, that is, two-dimensional arrays of infrared sensor elements are known in which one sensor element is less than 0.1 mm long and wide.

OBJECTS AND SUMMARY OF THE INVENTION

It is an object of the present invention to provide a radiation thermometer of straightforward construction and a radiation sensor and a method of computing the temperature for a radiation thermometer which enables selective measurement of the temperature of objects filling only part of the field of view of the radiation thermometer.

This object is accomplished with a radiation thermometer having a radiation sensor with multiple infrared sensor elements and multiple optical elements, wherein a single optical element is associated with either only one sensor element or a group of sensors comprising multiple sensor elements. The optical elements operate to ensure that the sensor elements or sensor groups are able to receive only radiation that is emitted by a region defined within narrow limits. In this manner, the field of view of the radiation thermometer is split into a plurality of partial fields of view whose temperatures can be measured individually. For the purposes of an ear thermometer, a certain amount of overlap of the individual partial fields of view is tolerable.

Advantageous for use in an ear thermometer is an infrared multiple sensor, that is, an array of multiple sensor elements arranged on a common substrate, because with such a multiple sensor a sufficiently small thermometer probe head can be realized. The optical elements are preferably combined to form a single optical component (multiple optical system), advantageously forming an integrated optical component. In a particularly advantageous aspect, a radiation sensor of the present invention includes a multiple sensor and a multiple optical system which is arranged in close proximity to or on the surface of the multiple sensor. Radiation sensors of this type are known, for example, from U.S. Pat. No. 5,701,008, JP-A-57-142526, JP-A-1-47923 and DE 36 33 199 A1.

Preferably, however, the optical elements and the sensor elements are configured as an integrated electro-optical temperature sensor in which the optical elements, for example, are provided directly on the surface of the multiple sensor. Such a temperature sensor can be manufactured using the methods known from semiconductor manufacture. An electro-optical infrared sensor in which the individual sensor elements are heat sensitive capacitors is known from U.S. Pat. No. 5,631,467.

A method of the present invention for temperature determination by means of a radiation thermometer as, for example, an ear thermometer, that includes a radiation sensor comprising multiple sensor elements enables in particular the temperature to be taken in a patient's ear, that is, the tympanic temperature to be measured, although the field of view of the radiation thermometer covers both parts of the tympanic membrane and parts of the ear canal. In such a case the sensor elements viewing the tympanic membrane will detect a higher temperature than the remaining sensor elements which view the ear canal. According to the present invention, the evaluation process uses only the temperature signals from those sensor elements that detect higher or significantly higher, or in other applications lower or significantly lower, temperatures than the remaining sensor elements.

In a particularly advantageous method, the process of temperature determination is preceded by a check to see whether the probe head of the thermometer is properly aligned in the ear canal. If it is not, that is, if the tympanic membrane is outside the field of view of the radiation sensor so that the probe head is directed at parts of the ear canal exclusively, all sensor elements will supply largely the same temperature values. Hence, when the evaluation of the temperature signals does not reveal a sufficiently appreciable temperature gradient within the field of view of the radiation sensor, the method of the present invention, rather than supplying a temperature measurement value, produces a corresponding error message or a request to repeat the measurement. In this embodiment of a thermometer of the present invention, it is necessary for the field of view of the radiation sensor to be greater than the diameter of the tympanic membrane so that also in cases where the probe head points directly at the tympanic membrane the surrounding ear canal is also covered, hence enabling the temperature gradient between the tympanic membrane and the ear canal to be identified.

A clinical thermometer operating according to the method of the present invention affords the advantage of obtaining excellent repeatability characteristics because the measured temperatures are largely independent of the respective placement of a probe head in the ear. According to the principle, namely, each measurement requires that only a single one or very few of a total of, for example, one hundred sensor elements view the tympanic membrane in order to be able to measure the tympanic temperature, that is, a potential fever condition, accurately.

Moreover, the structure of a radiation thermometer of the present invention is simplified in the use of a radiation sensor of the present invention because it obviates the need to provide as a waveguide a metal tube having its inside diameter gold plated as is otherwise customary, its functions being performed by the optical elements instead. Hence more possibilities are afforded in the design of the probe head of a radiation thermometer of the present invention because the radiation sensor may also be located directly at the end of the probe head, for example. Also, multiple radiation sensors arranged at relative inclinations may be provided at the end of the probe head in order to obtain a sufficiently wide field of view.

Embodiments of the present invention will be described in the following with reference to the accompanying drawing. Further embodiments are referred to in the description. In the drawing.

BELIEF DESCRIPTION OF THE DRAWINGS

FIG. 1 is a fragmentary view of a first temperature sensor of the present invention;

FIG. 2*a* is a top plan view of a fragment of a second temperature sensor of the present invention;

FIG. 2*b* is a cross section taken through FIG. 2*a* along line 2*b*—2*b*;

FIG. 3*a* is a top plan view of a fragment of a second temperature sensor of the present invention;

FIG. 3*b* is a cross section taken through FIG. 3*a* along line 3*b*—3*b*;

FIG. 4 is a schematic view of a radiation thermometer of the present invention; and FIG. 5 is a block diagram depicting a method of the present invention for determining a temperature.

DETAILED DESCRIPTION OF THE INVENTION

FIG. 1 illustrates schematically a fragment of a first temperature sensor 10 of the present invention. It is based on a sensor array known in the art in which multiple sensor elements 30 are arranged on a substrate 20 in a grid or matrix pattern. The size of the individual sensor elements is, for example, only 0.1×0.1 mm, and the width of the spaces between adjacent sensor elements is of the same order of magnitude, for example. Arranged above the sensor array is an infrared transparent layer 40 having a plane surface in which multiple intersecting grooves 50 are formed at regular distances, said grooves extending perpendicular to the surface above the spaces between the sensor elements. Hence there results above each sensor element 30 a right parallelepipedal waveguide formed by a portion of the layer 40 having its sides bounded by the grooves 50, its length corresponding to the thickness of the layer. The grooves may be filled with a material reflecting infrared radiation as, for example, gold. It is particularly advantageous for the grooves to be filled with an infrared radiation reflecting material to a predetermined height or depth only, the rest being filled with a material absorbing infrared radiation. Depending on the level to which the grooves are filled with reflecting or absorbing material, a corresponding limitation of the solid angle results from which infrared radiation can be passed through the waveguides bounded by the grooves to the associated sensor elements. The solid angle and hence the partial field of view of each sensor element is at its lowest value when the grooves are completely filled with infrared radiation absorbing material. In other variants of such a temperature sensor, the waveguides are not shaped in the form of a right parallelepiped but are, for example, cylindrical or possess some other suitable form. The form of the grooves is suitably adapted.

The thickness of the layer 40 is selected so that the partial fields of view of adjacent sensor elements overlap only a small amount, if at all, with the amount of overlap depending also on the relative distance of the object of measurement to the temperature sensor. For example, when the temperature sensor of the present invention is arranged at the forward end of the probe head 60 of an ear thermometer 70 (FIG. 4), the distance between the temperature sensor 10 and the tympanic membrane 80 or the ear canal 90 is very small, enabling the waveguides to be formed by a relatively thin layer which absorbs the infrared radiation to be measured in a correspondingly small amount, without an excessive amount of overlap of the partial fields of view having to be expected due to the then only low limitation of the solid angle.

In a variant of a temperature sensor of the present invention, multiple sensor elements are arranged beneath each waveguide. The field of view of the radiation sensors of the present invention is therefore dissolved into individual partial fields of view which are each associated with a group of adjacent sensor elements 30. This enables the measurement accuracy to be enhanced in known manner. Of particular advantage is a radiation sensor whose sensor array is constructed of sensor elements of the type described in DE 197 10 946 or EP 0 566 156 B1 initially referred to. During evaluation, the sensor signals supplied by the individual sensor elements of a group of sensors are first combined to a form a single signal which may be accomplished, for example, by averaging.

In a second embodiment of a temperature sensor of the present invention, the surface of the layer 40 is provided with a microlens structure, with a sensor element or a group of sensor elements 30 being arranged beneath each microlens 45. Preferably, the microlens layer is configured such that the sensor elements lie in the focal point of the associated microlens. In this temperature sensor the amount of overlap of adjacent partial fields of view is largely independent of the relative distance of the temperature sensor to the object of measurement. By comparison with the above described embodiment, it is therefore possible to make the layer 40 very thin, and a further variant of a temperature sensor of the present invention also permits omission of the grooves (FIG. 2).

In a third embodiment of a radiation sensor of the present invention (FIG. 3), there is disposed above the sensor array an apertured diaphragm 35 having multiple apertures 55 beneath each of which is a sensor element or a group of sensor elements. Similar to the grooves described in the foregoing, the apertured diaphragm may be made of a material reflecting infrared radiation as, for example, a sheet metal, or a material absorbing infrared radiation, or it may be formed of two layers comprising an absorbing and a reflecting layer. The apertures 55 in the diaphragm form multiple waveguides. The apertured diaphragm may also be made of any material provided that the inside diameters of the apertures are plated with a material as gold which possesses the desired infrared radiation reflecting or absorbing properties.

A radiation thermometer of the present invention differs from the known thermometers primarily in the use of a radiation sensor of the present invention and/or the application of the method of the present invention for determining a temperature. According to FIG. 4, the radiation thermometer 70 includes a probe head 60 having at its forward end a radiation sensor 10 of the present invention. It is however also possible to make provision there for multiple radiation sensors preferably arranged at relative inclinations to provide the radiation thermometer with a sufficiently large field of view. Moreover, the thermometer comprises a device for determining a temperature measurement value, which device uses for temperature determination only the temperature signals of that part of the sensor elements supplying a higher/lower or significantly higher/lower temperature value than the remaining sensor elements. Still further, a warning signal may be issued when the number of higher/lower or significantly higher/lower temperature values, related to the aggregate of the temperature values, drops below a predetermined threshold value.

The method of the present invention (FIG. 5) will be described by way of example with reference to a radiation thermometer whose radiation sensor comprises individual sensor elements $E_{ij}$ arranged in a matrix pattern, the indices i and j denoting the row and column, respectively, in which the respective sensor element is located. Each sensor element $E_{ij}$ issues a temperature signal $S_{ij}$ which corresponds to a temperature value $T_{ij}$.

The method of the present invention comprises a first step 101 of computing a temperature threshold value $T_S$ by averaging, for example, all temperature values $T_{ij}$. In a second step 102 a comparison is then made of the individual temperature values $T_{ij}$ with this temperature threshold value $T_S$. In an infrared ear thermometer only those temperature values $T'_{ij}$ that exceed the temperature threshold value $T_S$ are further processed. In other applications, only the lower temperature values are subjected to further processing.

A variant of the method of the present invention comprises an additional step 103 in which a check is made for each sensor element $E_{ij}$ whose temperature value $T'_{ij}$ exceeds the temperature threshold value $T_S$ to see whether its adjacent sensor elements $E_{(i\pm1)j}$, $E_{i(j\pm1)}$ and/or $E_{(i\pm1)(j\pm1)}$ deliver likewise temperature values exceeding the temperature threshold value $T_S$. Only the temperature values $T'_{ij(E')}$ of those sensor elements $E'_{ij}$ whose adjacent sensor elements supply likewise temperature values $T_{ij}$ greater than the temperature threshold value $T_S$ are further processed. In this manner only the temperature signals of those sensor elements enter the computation of a temperature measurement value T that originate from a contiguous warmer region, meaning those regions from which it can be assumed that they reflect the temperature values of the region of the tympanic membrane visible to the ear thermometer.

During further processing a step 104 involves the determination of a temperature measurement value T by averaging the temperature values $T'_{ij}$ or the temperature values $T'_{ij(E')}$, or by determining the peak value $T_{max}$ from the temperature values $T_{ij\ (E')}$.

In a modified method, rather than simply selecting and further processing the higher or lower temperature values $T'_{ij}$, the second step selects and further processes only those temperature values that are significantly higher/lower than the temperature threshold value $T_S$. A significantly higher/lower temperature value $T'_{ij}$ prevails, for example, when it exhibits a predetermined minimum temperature difference or a temperature difference to the temperature threshold value $T_S$ determined by empirical or statistical methods. It will be understood that it is also possible for the temperature threshold value $T_S$ to be determined with other methods than by averaging all the temperature values $T_{ij}$ supplied by the sensor elements $E_{ij}$. For example, the frequency distribution of the temperature values can be determined. When parts of the ear canal as well as parts of the tympanic membrane lie in the field of view of the multiple sensor, the sensor elements supply temperature values whose distribution may show two cluster points, one being representative of the ear canal temperature and the other of the tympanic temperature. As temperature threshold value $T_S$ that particular temperature value is determined that corresponds to the relative minimum of the frequency distribution curve lying between the two cluster points.

In the preferred variant of the method of the present invention, it is concluded from the presence of the two cluster points that the probe head of the thermometer is properly aligned. If no two cluster points are detectable, no temperature measurement value T is determined, the user being instead requested by a suitable indicator to repeat the measurement.

It will be understood, of course, that in a radiation thermometer of the present invention also other methods may find application, which use for determination of a temperature measurement value only the temperature signals of those sensor elements that detect infrared radiation from a warmer/cooler region by comparison with the remaining sensor elements. To cite an example, a gradient method shall also be mentioned which determines from the temperature values $T_{ij}$ of all sensor elements the position and direction of temperature gradients, deriving therefrom the position of the warmest/coldest region in the field of view of the radiation thermometer.

It will be appreciated that the method indicated above with its variants may of course find application in any radiation thermometer equipped with multiple sensor elements.

What is claimed is:

1. A method for determining a clinical temperature measurement value by means of a radiation thermometer which comprises a plurality of infrared sensor elements for detecting infrared radiation which outputs temperature signals which correspond to temperature values, said method comprising determining whether a substantially contiguous warmer region or a substantially contiguous colder region exist in the field of view of the thermometer based on said temperature values from adjacent infrared sensor elements, and determining said temperature measurement value using only the temperature values either of the warmer region or the colder region.

2. The method as claimed in claim 1, wherein a warning signal is issued when a number of higher or lower or significantly higher or lower temperature values, related to the aggregate of all temperature values, drops below a predetermined threshold value.

3. The method as claimed in claim 1, wherein a temperature measurement value is only determined when the frequency distribution of the temperature values of all sensor elements exhibits two cluster points.

4. The method as claimed in claim 1, wherein temperature values of all sensor elements are used in determining the position and direction of temperature gradients, deriving therefrom the position of the warmest or coolest region in the field of view of the radiation thermometer, and in determining a temperature measurement value using only those temperature values that originate from the warmest or coolest region.

5. The method as claimed in claim 1, wherein a first step is computing a temperature threshold value from the temperature signals, and then only using the temperature signals of those sensor elements that supply a temperature value higher or lower or significantly higher or lower than the temperature threshold value.

6. The method as claimed in claim 1 or 5, wherein said method of determining a temperature measurement value uses only the higher or lower temperature values of those sensor elements whose adjacent sensor elements deliver likewise higher or lower temperature values by sensing the infrared radiation from adjacent regions.

7. The method as claimed in claim 6, wherein the temperature measurement value is the highest or lowest temperature value of all higher or lower temperature values of adjacent sensor elements.

8. A clinical radiation thermometer comprising:

a plurality of infrared sensor elements for detecting infrared radiation and for outputting temperature signals which correspond to temperature values;

a plurality of optical elements each of which is associated with at least one infrared sensor element and defines the solid angle from which radiation can impinge on said at least one of the infrared sensor elements;

a device for determining a temperature measurement value, said device, responsive to said temperature values of said infrared sensor elements, determining whether a substantially contiguous warmer region and/ or a substantially contiguous colder region exist in the field of view of the thermometer based on temperature values from adjacent sensor elements and determining a temperature measurement value using only the temperature values either of the warmer region or the colder region.

9. The radiation thermometer as claimed in claim 8, wherein the infrared sensor elements are integrated on a common substrate.

10. The radiation thermometer as claimed in claim 8 or 9, wherein the optical elements are connected with each other.

11. The radiation thermometer as claimed in claim 8 or 9, wherein the optical elements include a radiation transmissive layer through which grooves extend.

12. The radiation thermometer as claimed in claim or 8 or 9, wherein the optical elements are integrated with the sensor elements.

13. The radiation thermometer as claimed in claim 8 or 9, wherein at least one of said radiation sensor elements is arranged at the forward end of a probe head.

14. The radiation thermometer as claimed in claim 8 or 9, wherein said device for determining a temperature measurement value uses only the temperature signals of the sensor elements supplying a significantly higher or lower temperature value than the remaining sensor elements.

* * * * *